United States Patent [19]

Brey

[11] 4,160,880

[45] Jul. 10, 1979

[54] MODULAR TERMINATION SYSTEM FOR COMMUNICATION LINES

[75] Inventor: William A. Brey, Schaumburg, Ill.

[73] Assignee: Reliable Electric Company, Franklin Park, Ill.

[21] Appl. No.: 911,874

[22] Filed: Jun. 2, 1978

[51] Int. Cl.² .............................................. H04Q 1/14
[52] U.S. Cl. .................................. 179/98; 339/18 R; 361/428
[58] Field of Search ........ 179/98, 91 R, 175, 175.2 R; 361/425–428; 339/18 R, 18 B, 18 C

[56] References Cited

U.S. PATENT DOCUMENTS

| | | | |
|---|---|---|---|
| 3,573,373 | 4/1971 | Mullin et al. | 179/98 |
| 3,831,128 | 8/1974 | Paluch | 339/18 B |
| 3,851,114 | 11/1974 | Bush et al. | 179/98 |
| 3,855,427 | 12/1974 | Sinden | 179/98 |
| 3,869,582 | 3/1975 | Humphrey et al. | 179/98 |
| 3,904,936 | 9/1975 | Hamrick, Jr. et al. | 361/428 |
| 3,970,802 | 7/1976 | Nijman | 179/98 |
| 4,002,856 | 1/1977 | Sedlacer et al. | 179/98 |
| 4,018,997 | 4/1977 | Hoover et al. | 179/98 |
| 4,057,692 | 11/1977 | DeBortoli et al. | 179/98 |

OTHER PUBLICATIONS

Bunker Ramo Corporation, Cadre Division, "Connectorized Blue Fields", Section 631-470-201 of Bell System Practices Manual, Issue 1, Jul. 1969 (pp. 2-6, 9-12 and 15), and Issue 2, Sep. 1970 (pp. 21-23).

Primary Examiner—Kathleen H. Claffy
Assistant Examiner—Gerald L. Brigance
Attorney, Agent, or Firm—Trexler, Wolters, Bushnell & Fosse, Ltd.

[57] ABSTRACT

A modular termination system includes one or more first terminal block modules aligned side by side and second terminal block modules spaced vertically below the first modules. Jumper routing modules are interposed between the first terminal block modules and second terminal block modules and between the two rows of second modules for orderly routing of jumper wires. The second modules are hingedly mounted to a base which also mounts a plurality of cable connectors and cable guides disposed for orderly arrangement of cables running to the cable connectors. The hinges allow access to the backs of the terminals on the second terminal block modules, and to conductors wired to the back sides of the terminals from the cable connectors. The first terminal block modules are mounted upon panel-supports which also mount similar cable connectors which are joined by conductors to the back sides of the terminals on these terminal block modules.

10 Claims, 10 Drawing Figures

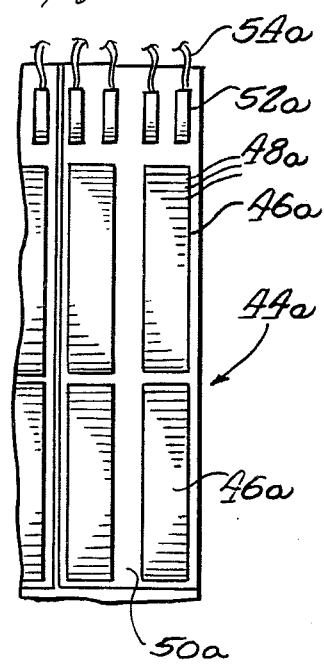
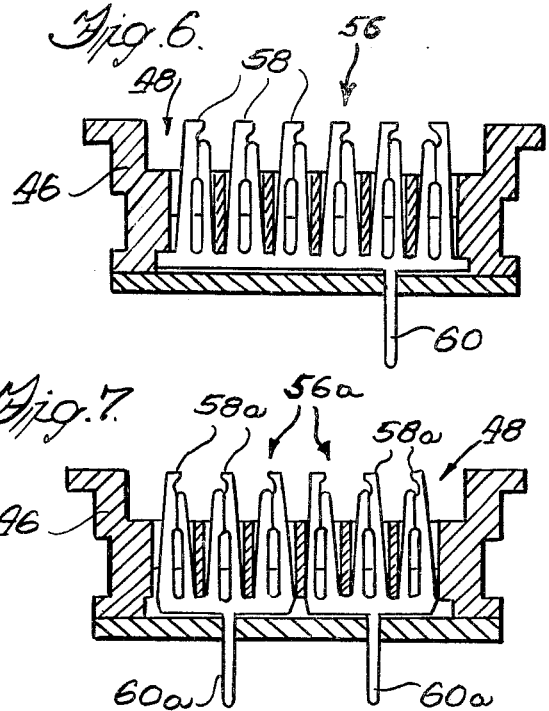
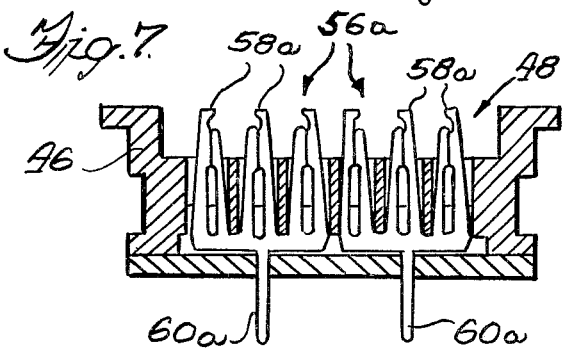
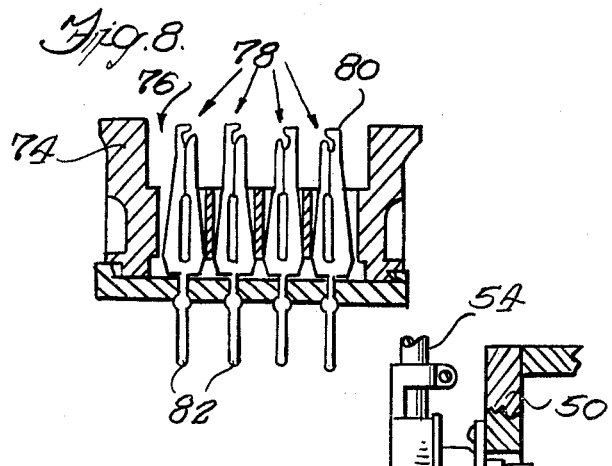
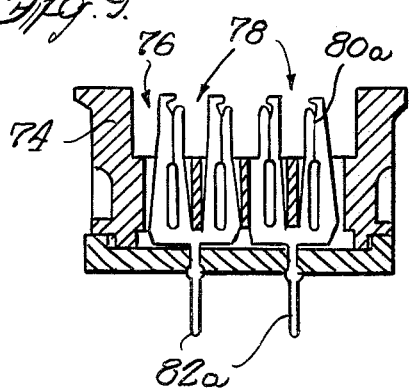
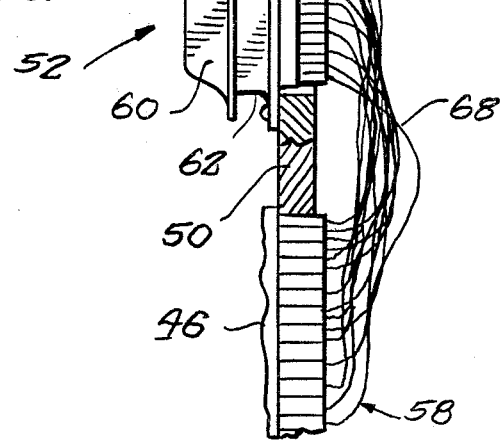

MODULAR TERMINATION SYSTEM FOR COMMUNICATION LINES

BACKGROUND OF THE INVENTION

The present invention is directed generally to apparatus for termination and distribution of telephone or like communication lines, and more particularly to a modular system for such termination and distribution. This modular system may terminate different numbers of line pairs and be constructed to serve as a main entrance or interface terminal, as a riser terminal, or as a distribution terminal.

In relatively large telephone or other communication lines installations, for example in large buildings, different types of termination assemblies are required for terminating and distributing lines throughout the building. For example, a main entrance terminal is required to receive telephone lines entering the building and to distribute these lines among different portions, or to different floors, of the building. Such distribution is initially accomplished by riser cables leaving the main entrance terminal and running to the other floors or areas. These riser cables are commonly fed to riser terminals, which terminate the riser cables for distribution on a particular building floor, and feed additional riser cables to further floors. The distribution of lines on each floor is handled by one or more distribution terminals, which provide terminating facilities for key telephone service, station or other communication lines fed by distribution cables from the riser terminal. Yet other types of termination assemblies, generally known as interface terminals, may terminate both outside lines and station lines.

Prior art arrangements include backboards having a number of brackets mounted thereon for accepting predetermined numbers and configurations of terminal blocks. These terminal blocks mount a plurality of electrically conductive terminals for receiving wires or conductors to be terminated thereon. Generally, the number of lines which may be terminated on such an assembly depends upon the number and configuration of the terminals carried on the terminal blocks mounted on the backboard brackets. When terminal blocks have been mounted on a backboard, the structure is generally referred to as a "field." In typical installations, then, various combinations of fields form either a riser terminal, a distribution terminal, a main entrance terminal or an interface terminal, as required. The numbers and configurations of fields utilized in each of these terminals is different, requiring some degree of skill of the workman or installer, in addition to reference to installation manuals and instructions, for the proper assembly of the terminal structure from the components available. Once the required fields have been assembled by mounting appropriate terminal blocks on the appropriate backboards, the lines to be terminated at the terminal structure must be individually attached to the appropriate terminals. This procedure is also relatively complex and time consuming, as many as several hundred line pairs being accommodated in a typical terminal structure. Moreover, connections must generally be made with both the front and back sides of the terminals on the terminal blocks. Additionally, a plurality of jumper wires are generally required between the front sides of terminals of the different fields. It will be appreciated, that in the course such complex wiring there is considerable opportunity for error.

Accordingly, one known prior art structure has been proposed to eliminate some of the wiring to be performed by the installer, by providing conventional connectorized cables prewired to carry the desired number of telephone lines. Mating connectors for receiving these cables are mounted on the backboard of a field and prewired to the back sides of the terminals of the field. This arrangement relieves the installer or workman from manually terminating approximately one half of the wires in the field, that is, those wires running from the cable to the back sides of the terminals.

Another problem in the construction and assembly of such large terminals is the effective utilization of available space in a building, to accommodate such a structure. For example, closets or cabinets are generally provided for such installations, and as such offer only a limited space to accommodate a terminal structure. Moreover, the terminal structures of the prior art are generally of limited height or vertical extent, commonly only permitting a maximum of three backboards or field assemblies to be mounted vertically. A significant limitation in this regard lies in the number of jumper wires between the various fields which may be conveniently and relatively neatly run and cabled in the prior art structures. These structures, it should be noted, mount all of these terminal blocks in a generally vertical orientation, requiring the majority of jumper wires to be cabled and run generally vertically. Accordingly, should additional field assemblies be required to accommodate additional telephone equipment in an existing assembly, these fields must be added to the sides of the existing structure. In view of relatively limited installation space such additional space to the sides of a terminal may not be available in many installations. However, in a typical building installation considerable vertical space is generally available between floor and ceiling of the building. But the vertical orientation of prior art structures makes vertical mounting of additional fields difficult or impossible.

All of the above considerations present significant problems to the telephone installer and invite both inefficiency and error in constructing and assembling relatively large terminal installations.

OBJECTS AND SUMMARY OF THE INVENTION

Accordingly, it is a general object of this invention to provide a new and improved termination system for telephone and like communication lines.

A more specific object of the invention is to provide such a termination system which is modular in form, the number and types of modules requied for any type of terminal installation being relatively simple to choose and assemble.

A related object is to provide such modules such that the same basic configuration thereof may be utilized in any terminal structure, the numbers of modules used being the only variable for accommodating larger terminal structures.

Another object is to provide a modular terminal system of the type described wherein significant portions are prewired so as to eliminate considerable time and labor on the part of the installer and reduce the possibilites for error.

A related object is to provide a modular terminal system of the type described wherein orderly routing is provided for all cable runs in the assembled terminal structure.

Briefly, and in accordance with the foregoing objects, the present invention provides an arrangement terminating telephone and like communication lines comprising a first field, said first field comprising a first plurality of dielectric connector blocks each having electrically conductive terminals thereon. The terminals have front and back sides which are respectively at opposite sides of the associated connector block, the connector blocks being mounted on a panel-support. Cable connectors are also mounted on the panel-support and have conductors extending therefrom which are terminated at the back sides of the terminals, said connectors being adapted for receiving mating connectors from cabled telephone lines. A second field is spaced from the first field, the second field comprising a second plurality of dielectric connector blocks each having electrically conductive terminals thereon, the terminals having front and back sides which are respectively at opposite sides of the associated connector block. Means are provided forming a support for the second plurality of terminal blocks and a hinge connects this last-mentioned support to a base. Additional connectors are fixed relative to the base and have wires extending therefrom and to the back sides of the terminals of the second plurality of terminal blocks. These additional connectors are adapted to receive mating connectors of cabled telephone lines. A plurality of cable guides are mounted on the base and are off-set from each other for locating the cables side-by-side as they run in a direction away from the field. The cable guides are presented to the back sides of the second terminals. Means are provided for routing jumper wires from the front sides of the terminals of one field to the front sides of terminals of the other field.

BRIEF DESCRIPTION OF THE DRAWINGS

In the drawing:

FIG. 5 is a front elevation of an alternate form of a portion of a modular assembly in accordance with this invention;

FIG. 6 is an enlarged sectional view, taken generally along the line 6—6 of FIG. 2;

FIG. 7 is a view of an alternate form of the section illustrated in FIG. 6;

FIG. 8 is an enlarged sectional view, taken generally along the line 8—8 of FIG. 2;

FIG. 9 is a view of an alternate form of the section illustrated in FIG. 10, and FIG. 10 is an enlarged fragmentary sectional view, taken generally along the line 10—10 of FIG. 2.

DETAILED DESCRIPTION OF THE ILLUSTRATED EMBODIMENT

Figure 1:
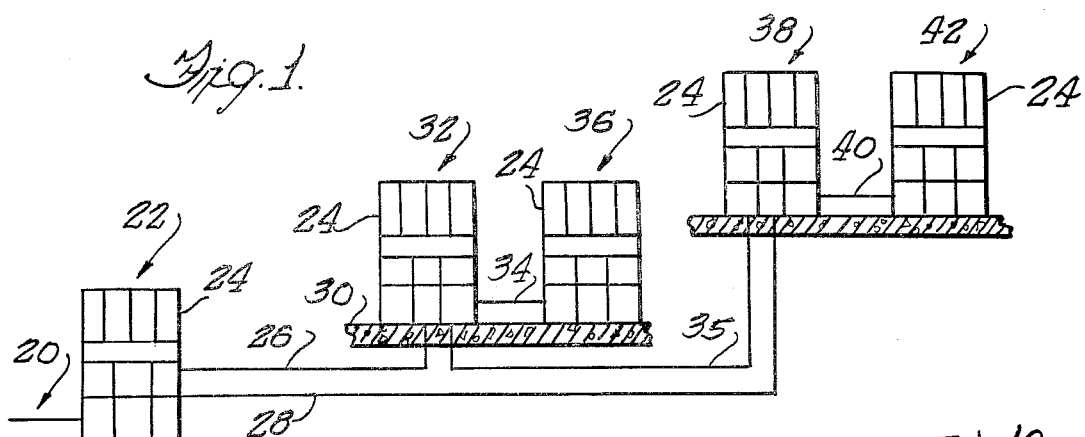
FIG. 1 is a diagrammatic illustration of a typical telephone or like communications lines installation in a multi-story building, wherein the present invention is advantageously utilized.

Referring initially to FIG. 1, a typical telephone line installation in a multi-story building is diagrammatically illustrated. Outside lines designated generally 20 and forming an entrance cable are terminated at an entrance terminal designated generally 22, which comprises a modular termination system 24 of the present invention. This entrance terminal 22 may serve station terminations as well as the outside entrance cable 20, and thus be designated as an interface terminal. Riser cables 26 and 28 exit the entrance or interface terminal 22 to provide lines to other floors or areas of the building. In this regard, a first floor 30 has a riser terminal designated generally 32, which also comprises a modular termination system 24 of this invention, and which receives or terminates the riser cable 26. A distribution cable 34 and further riser cable 35 exit the riser terminal 32. The distribution cable 34 feeds a distribution terminal generally designated 36 which also comprises a system 24 of the present invention, and distributes or terminates facilities for key telephone service, and for station and other communication lines throughout the floor 30. The riser cables 28 and 35 are fed to a further riser terminal designated generally 38 which also comprises a system 24 of this invention and functions similarly to the riser terminal 32. This riser terminal 38 also feeds a distribution cable 40 which in turn feeds a further distribution terminal designated generally 42 and also comprising a modular system 24 of this invention, which is substantially similar to the above described distribution terminal 36. Accordingly, as seen in FIG. 1, modular termination systems 24 according to the invention are useable for entrance or interface terminals, riser terminals or distribution terminals, each of these uses having a similar modular construction, and differing primarily in the number of modules utilized therein.

Figure 2:
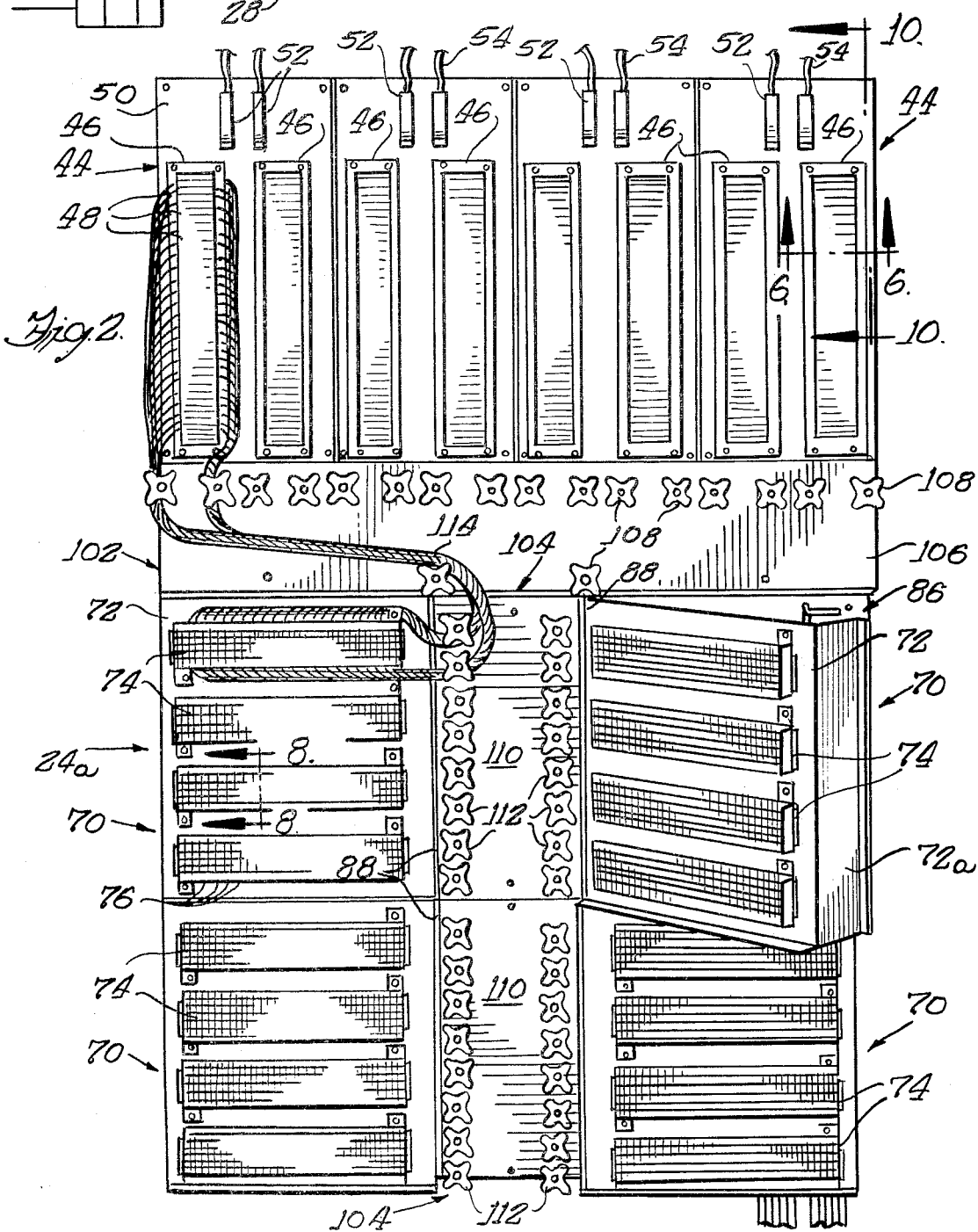
FIG. 2 is a front elevation of a modular termination assembly in accordance with one aspect of the present invention.

Referring now to FIG. 2, an exemplary modular termination system in accordance with this invention which may comprise any one of the systems 24 of FIG. 1, is designated generally 24a. It will be understood that the invention is not limited to the embodiment illustrated in FIG. 2, other arrangements being possible but differing, as indicated above, primarily in the number of like modules or components utilized therein, rather than their general structure or configuration.

The modular termination system 24a comprises at least one first field module designated generally 44 which includes a pair of dielectric connector or terminal blocks 46, each carrying a plurality of terminals arranged in rows 48. The dielectric terminals blocks 46 are mounted side by side upon a panel-support member 50, the terminal blocks 46 being generally vertically oriented (longer dimension vertical) so as to hold the rows 48 of terminals in a substantially vertical array. A pair of cable connectors 52 are also mounted upon the panel-support 50 and preferably comprise conventional cable connectors. In the illustrated embodiment, these cable connectors 52 comprise 25 pair connectors of the type generally designated 224-02-50, available from the TRW-Cinch Company. These connectors 52, receive cabled telephone lines on cables 54, and achieve connection of these telephone lines at the back sides of the panel-support members 50 with the back sides of the respective terminal blocks 46, as will be described in additional detail below.

As best seen in FIG. 6, the rows of terminals 48 generally comprise terminal members 56 having front sides 58 and back sides 60. In the illustrated embodiment, the front sides 58 comprise clip-type connectors, and the back sides 60 are wire-wrap posts. These terminals 56 are mounted in the terminal block 46, as illustrated in FIG. 6, so that the front sides 58 extend outwardly of the front side of the block 46, and the back sides 60 extend outwardly of the back side of the block 46. In the embodiment illustrated in FIG. 6, the front sides 58 of the terminals 56 are 6 in number and formed electrically in common, the single back side 60 being formed electrically in common with the front sides 58. In an alternate embodiment, as illustrated in FIG. 7, each of the rows of terminals 48 comprises a pair of terminals 56a, the front sides 58a of each being three in number and a back side 60a being electrically in common with three front sides 58a. It will be understood that the terminals 56 of each row 48 in the terminal block 46 may be of different types, numbers, or configurations so as to present any desired combination of wire terminating members at the front and back of the blocks 46. In this regard the choice of terminals 56 will depend upon the number of wire conductors to be accommodated at each side of the terminal block 46.

As best seen in FIG. 10, the connectors 52 each comprise a plug 60 and a mating socket 62 for terminating a plurality of lines from one of the cables 54 of telephone or like communication lines. In the illustrated embodiment, each connector 52 is capable of accommodating up to twenty five pairs of telephone lines. The sockets 62 are mounted upon the panel-support 50 as illustrated in FIGS. 2 and 10. A plurality of conductors 68, which are conductive extensions of the telephone lines of the cable 54, extend out the back side of the panel-support 50 and terminate at selected back sides 60 of the terminals 56 in the blocks 46.

In the embodiment illustrated in FIG. 2, the first field modules 44 are four in number and aligned side by side, their panel-supports 50 being generally coplanar. Referring briefly to FIG. 5, an alternate embodiment of a module 44 is designated generally 44a, and is substantially similar to the modules 44 of FIG. 2. The module 44a differs only in that four terminal blocks 46a and four cooperating cable connectors 52a for cables 54a are mounted on a larger panel-support 50a. The embodiment of FIG. 5 thus differs from that of FIG. 2 only in that a larger number of telephone or like communications lines may be accommodated thereby.

Referring back to FIG. 2, second field modules designated generally 70 are located spaced apart from and generally vertically below the first modules 44. Each second field module 70 includes a support member 72 which mounts four dielectric connector or terminal blocks 74, in similar fashion to the mounting of the dielectric connector or terminal blocks 46 on the panel-supports 50, described above. These dielectric connector blocks 74 hold a plurality of terminals arranged in rows 76, the connector blocks 74 being oriented on the support members 72 for arranging the rows of terminals in a substantially horizontal array. The terminals of the rows 76, as best seen in FIG. 8, generally comprise terminal members 78 having front sides 80 and back sides 82 at opposite sides of the block 74. In the embodiment of FIG. 8, four terminal members 78 each have a single front side 80 and single back side 82, four of such terminals 78 being included in each row 76. The front sides 80 are clip-type connectors and the back sides 82 are wire wrap posts, in the illustrated embodiment. In an alternative embodiment illustrated in FIG. 9, each row 76 has two terminals 78 each including two front sides 80a in common with a single back side 82. In similar fashion to the terminals 56 of the blocks 46, described above, these terminals 78 may be of different types, numbers and configuration, each row 76 presenting as many front sides and/or back sides as required to terminate a desired number of wire conductors.

Referring back to FIG. 2, it will be seen that the second field modules 70 in the illustrated embodiment are four in number, and positioned in two vertical rows of two field modules 70 each, so as to occupy substantially the same width as the four first field modules 44 positioned thereabove. These four field modules 70 are mounted on a base member or panel 86, by hinges 88. Consequently, the field modules 70 may each be hingedly moved away from the base 86 about a vertical hinge axis for access thereto, as illustrated by the upper right hand field module 70 of FIG. 2 and in FIG. 4 and by the two left hand modules in FIG. 3.

Figure 3:
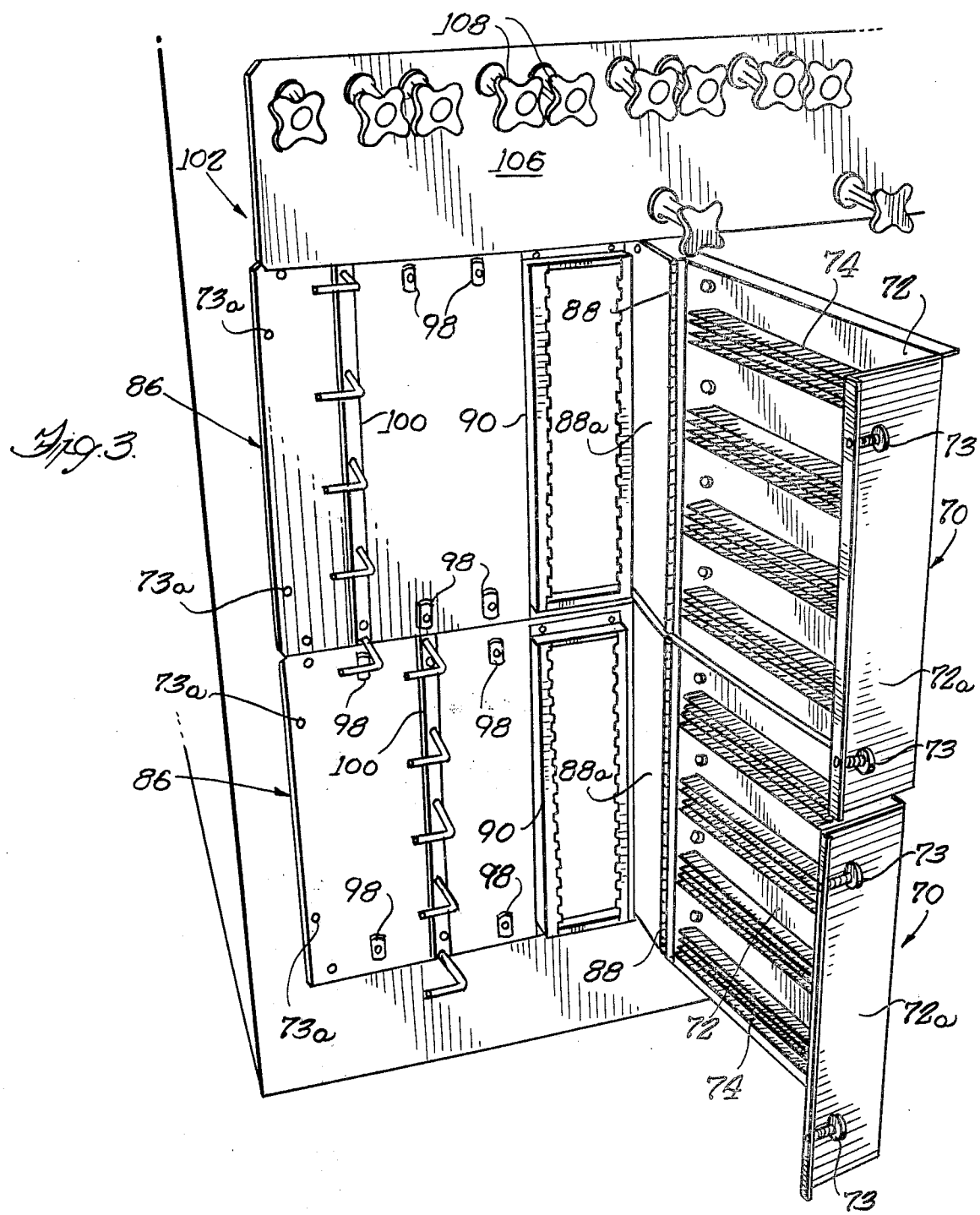
FIG. 3 is an enlarged fragmentary perspective view of a portion of the assembly of FIG. 2 and with a field module partially swung open.
Figure 4:
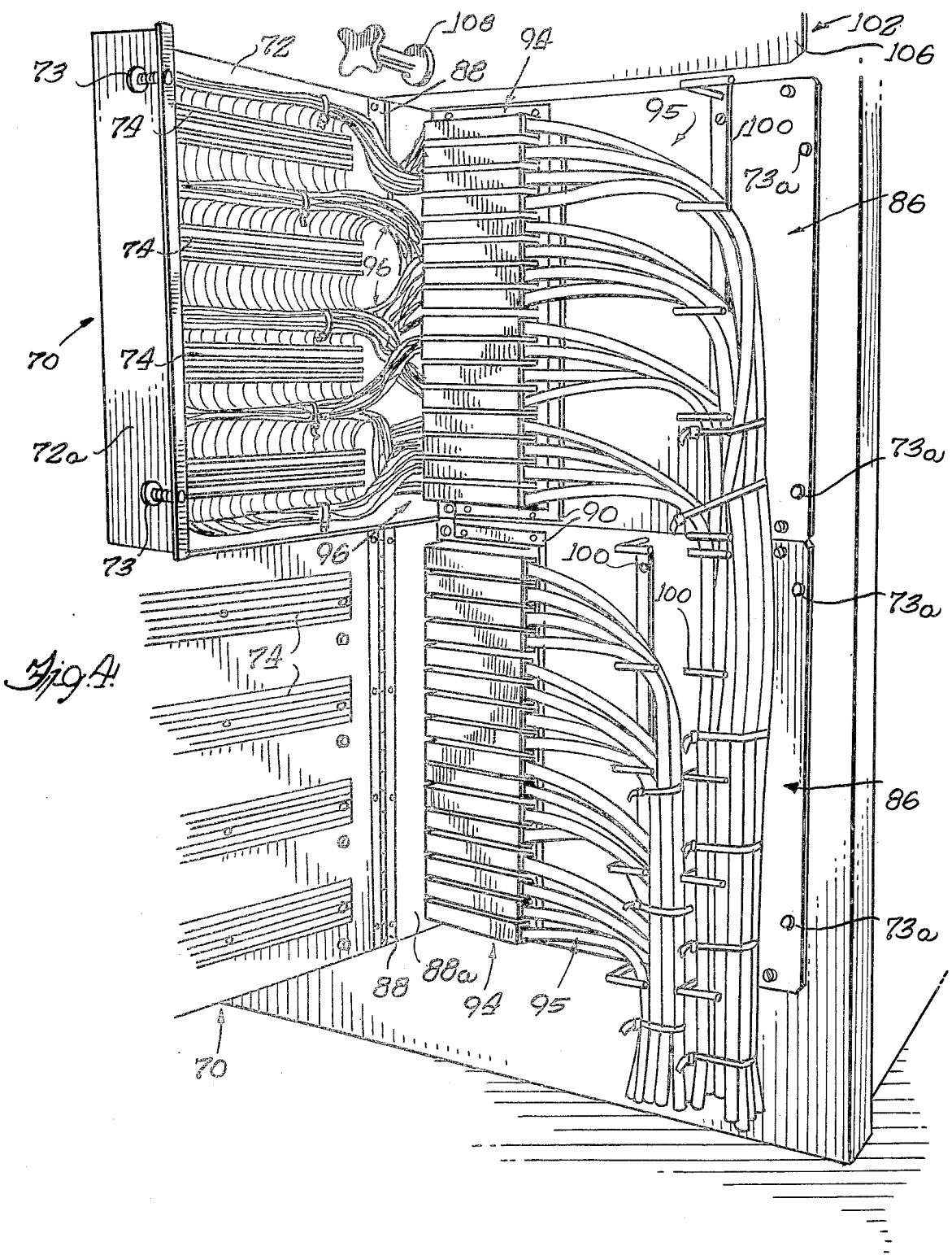
FIG. 4 is an enlarged fragmentary perspective view of another portion of the assembly of FIG. 2 and with field modules swung open.

Referring further to FIGS. 3 and 4, the field modules 70 are illustrated in an open position on their hinges 88, allowing access to their respective base members 86 and components associated therewith, which will now be described in additional detail. The structures of FIGS. 3 and 4 are shown in various stages of assembly, to facilitate a clear illustration of the elements involved. Each panel-support 72 has a side wall portion 72a, which together with a similar opposing side wall 88a, which mounts the associated hinge 88, holds the panel 72 a distance above the associated base member 86, when "closed" with respect thereto. This distance is such as to align the support panels 72, when "closed," parallel to and somewhat above the plane of the panel-supports 50 of the first field modules 44. Suitable fasteners 73 on side walls 72a cooperate with receiving holes 73a on base panels 86 to releasably attach this side of the modules 70 with the base panels 86, when the panels 72 are in the "closed" position.

The base members or panels 86 each carry a raised frame or bracket member 90 which is adapted to mount, in vertical array, a plurality of ribbon-type cable connectors designated generally 94, which receive cables 95. These cable connectors 94 and the cables 95, are substantially identical to the cable connectors 52 and cables 54 associated with the field modules 44. The brackets 90 are open at their sides adjacent the hinges 88 to allow individual conductors 96 from the connectors 94 to be run to the back sides 82 of the terminals 78 in the terminal blocks 74. The base members 86 also include three pairs of horizontally spaced or off-set mounting holes, designated generally 98, for mounting cable guides 100 which locate or route the cables 95 associated with the cable connectors 94. It will be noted that the horizontal arrangement of the blocks 74 further facilitates an orderly arrangement of connectors 94, cables 95 and wires 96, as illustrated. The cable guides 100 of the respective bases 86 are therefore mounted horizontally off-set, for arranging or locating the cables 95 side by side, in an orderly fashion, as they are guided away from the connectors 94 and along the base members 86, to exit the terminal structure.

Referring again to FIG. 2, jumper routing modules designated generally 102 and 104 provide means for the orderly routing of jumper wires between the front sides of the terminals of the respective field modules 44 and 70. The first jumper routing module 102 is positioned in the space between the first field modules 44 and the second field modules 70, and comprises a front surface or support panel 106. A plurality of outwardly extending distribution guide posts 108 are mounted on the panel 106. In the illustrated embodiment, the plane of the surface or support panel 106 is generally coplanar with the surfaces of the panel-support members 50 of the field modules 44. Similarly, the jumper routing modules 104 each comprises a support panel 110 which defines a surface generally coplanar with the surface of the support panel 106. Each panel 110 mounts a plurality of distribution guide posts 112, substantially identical with the guide posts 108, and extending outwardly of the surface of the support panel 110. Accordingly, an orderly routing path is provided by the guide posts 108 and 112 for jumper wires running between the front sides of the field modules 44 and 70, for example as illustrated by bundled jumper wires designated generally 114. In the illustrated embodiment, two of these latter jumper routing modules 104 are utilized, one such module serving the two field modules 70 at either side thereof. In this regard, it will be appreciated that the horizontal orientation of the blocks 74 and the vertical orientation of the blocks 46 further facilitate the orderly routing of jumper wires 114 therebetween.

The embodiment illustrated in FIGS. 2 through 4 is an exemplary configuration of a terminal structure utilizing the modular elements of this invention. Different terminal structures may also be assembled therefrom, for example, a terminal structure may comprise fewer ones of each module, or may be enlarged by adding further modules. In this respect, one or two additional modules 70, bases 86 and associated components may be added vertically below the bottommost pair of illustrated modules 70, and an additional jumper routing module 104 added directly below the illustrated modules 104 to accommodate additional telephone lines. Accordingly, modular terminal systems of varying capacities may be relatively easily assembled and expanded upon, using the modules described. The numbers of modules utilized, and their terminal configuration may be chosen to construct any of the types of terminal structures illustrated and described above with reference to FIG. 1, so as to accommodate the desired number of telephone or like communication lines. Advantageously, as the cable connectors 52 and 94 are pre-wired to the back sides of the terminals in the respective terminal blocks 46 and 74, a substantial amount of wiring previously performed by the installer is eliminated, greatly reducing the potential for error.

The invention is claimed as follows:

1. An arrangement terminating telephone and like communication lines comprising a first field, said first field comprising a first plurality of dielectric connector blocks each having electrically conductive terminals thereon, the terminals having front and back sides that are respectively at opposite sides of the associated connector block, a panel-support upon which said blocks are mounted, and connectors having conductors extending therefrom and which are terminated at the back sides of said terminals and adapted for connections to telephone lines, a second field comprising a second plurality of dielectric connector blocks each having electrically conductive terminals thereon, the terminals of the second plurality of blocks also having front and back sides that are respectively at opposite sides of the associated connector block, means forming a support for said second plurality of terminal blocks, base means, a hinge connecting said last-mentioned support to the base means, additional connectors fixed relative to said base and having wires extending therefrom and to the back sides of the terminals of said second plurality of terminal blocks, a cable extending from each additional connector, each cable being a conductive extension of a plurality of said wires and adapted for connections to further telephone lines, a plurality of cable guides receiving said cables and being offset from each other for locating the cables side-by-side as they run in a direction away from said first field, the cable guides being presented to said back sides of the second terminals, and means for routing jumper wires from the front sides of the terminals of one field to the front sides of terminals of the other field.

2. An arrangement according to claim 1 in which said first and second fields are vertically spaced and said second field includes two groups of connector blocks one above the other, each group having a support hingedly connected to said base means, and means for adjusting the side-by-side positions of said cable guides.

3. A modular termination system for telephone and like communication lines comprising: at least one first field module, said first field module comprising a first plurality of dielectric connector blocks each having electrically conductive terminals thereon, the terminals having front and back sides that are respectively at opposite sides of the associated connector block, a panel-support upon which said connector blocks are mounted, and connectors also mounted upon said panel-support and having conductors extending therefrom which are terminated at the back sides of said terminals, said connectors being adapted for making electrical connections between said conductors and cables carrying a plurality of telephone lines, at least one second field module, said second field module comprising a second plurality of dielectric connector blocks each having electrically conductive terminals thereon, the terminals having front and back sides that are respectively on opposite sides of the associated connector block, means forming a support for said second plurality of connector blocks base means, a hinge connecting said last-mentioned support to said base means, additional connectors affixed relative to said base means and having second conductors extending therefrom and to the back sides of the terminals of said second plurality of connector blocks, said additional connectors being adapted for making electrical connections between said second conductors and further cables carrying a further plurality of telephone lines.

4. The system of claim 3, further including a plurality of cable guides mounted on said base means for routing said further cables, and means for routing jumper wires between the front sides of the terminals of the first field module and of the second field module.

5. The system of claim 4 in which said second field modules are two in number, and are located one vertically above the other, each being hingedly connected to said base means, and further including means for mounting ones of said plurality of cable guides in association with each of said second field modules, the cable guides being presented to the back sides of the terminals associated with said second field modules and said mounting means adjusting the positions of said cable guides to provide an off-set between the respective cable guides associated with each of said second field modules.

6. A system according to claim 5 wherein said first field modules are four in number and aligned side-by-side, the panel-supports of said modules being substantially coplanar, and wherein said means for routing jumper wires includes a jumper routing module mounted interposed between said first field modules and said second field modules and defining a front surface generally coplanar with said panel-supports of said first field modules, and a plurality of guide posts extending outwardly of said front surface for guiding said jumper wires between the front sides of the terminals of the first and second field modules.

7. The system of claim 6 further including further jumper routing modules mounted adjacent the hinged sides of said second field modules and having front surfaces generally in the plane of the front surface of said first mentioned jumper routing module and a plurality of similar guide posts extending outwardly therefrom.

8. A system according to claim 7 wherein said base means includes means for hingedly mounting additional second field modules adjacent the last-mentioned jumper modules at the sides thereof opposite the hinged sides of said first pair of second field modules, and at least one additional further jumper routing module and a further pair of second field modules to either side thereof are further mountable upon said base means directly vertically below the respective last-mentioned second field and jumper routing modules.

9. A system according to claim 8 further including means for mounting further ones of said cable guides on said base means behind said further pair of second field modules and for off-setting said further cable guides from the cable guides associated with each of said second field modules thereabove.

10. The system according to claim 9 wherein each of said connector blocks of said first field modules have their terminals arranged in rows, and are disposed upon said panel-support so as to hold the rows of terminals in substantially vertical array, and wherein the connector blocks of said second field modules have their terminals arranged in a plurality of rows and are disposed upon their associated supports so as to hold the rows of terminals in substantially horizontal array.

* * * * *